United States Patent
Schlosser et al.

[11] Patent Number: 5,860,889
[45] Date of Patent: Jan. 19, 1999

[54] TANDEM FORWARD REAR AXLE LOCKOUT

[75] Inventors: Kraig J. Schlosser, Ft. Wayne; Ted J. Kaufman, Ossian, both of Ind.

[73] Assignee: Dana Corporation, Toledo, Ohio

[21] Appl. No.: 566,084

[22] Filed: Dec. 1, 1995

[51] Int. Cl.$^6$ .......................... F16H 48/06; B62D 61/10
[52] U.S. Cl. ................ 475/221; 475/206; 180/24.09; 74/66.56 B
[58] Field of Search ................... 475/205, 206, 475/224, 223, 231, 232, 233, 235; 74/665 GB, 665 GC, 665 S, 665 T; 180/24.09, 24.11

[56] References Cited

U.S. PATENT DOCUMENTS

| | | | |
|---|---|---|---|
| 2,603,108 | 7/1952 | Carlson | 475/221 X |
| 2,914,128 | 11/1959 | Christie | 180/22 |
| 3,146,842 | 9/1964 | Nelson et al. | 180/22 |
| 3,770,072 | 11/1973 | Cheney | 180/24.09 |
| 3,848,691 | 11/1974 | Dolan | 475/206 X |
| 3,894,446 | 1/1975 | Snoy et al. | 180/24.09 X |
| 3,975,154 | 8/1976 | Clark et al. | 180/24.08 X |
| 4,046,210 | 9/1977 | Nelson | 180/24.1 |
| 4,050,534 | 9/1977 | Nelson et al. | 180/24.09 |
| 4,194,586 | 3/1980 | Hicks | 475/198 X |
| 4,206,662 | 6/1980 | Manz | 475/232 |
| 4,432,431 | 2/1984 | Russell | 180/248 |
| 4,601,359 | 7/1986 | Weismann et al. | 74/665 GB |
| 4,733,578 | 3/1988 | Glaze et al. | 74/713 |
| 4,773,500 | 9/1988 | Naito et al. | 180/233 |
| 5,299,986 | 4/1994 | Fabris et al. | 475/231 X |
| 5,370,018 | 12/1994 | Kwasniewski | 475/200 X |

*Primary Examiner*—Khoi Q. Ta
*Attorney, Agent, or Firm*—Oldham & Oldham Co., LPA

[57] ABSTRACT

A tandem rear axle assembly for vehicles including trucks comprises an interaxle differential and a differential lockout mechanism which includes a friction clutch or clutch pack comprising a multiplicity of parallel annular clutch disks arranged in interleaved first and second sets. The clutch pack may be concentric with an input shaft which transmits torque from a vehicle drive shaft to the interaxle differential. The first set of clutch disks may rotate with the input shaft. The second set of clutch disks is in driving engagement with an output gear of the interaxle differential, which drives a pinion shaft to transmit torque to a forward rear axle of the vehicle. The clutch is disengaged under normal driving conditions. The rear axle assembly further includes a clutch actuator assembly comprising first and second sensors for sensing the respective rotational speeds of the rearward rear axle and the forward rear axle, and a computer-control circuit which generates an output signal when the difference exceeds a predetermined maximum. The output signal actuates, for example, by means of air pressure, a piston which compresses the clutch pack so as to engage the clutch and thereby lock out the interaxle differential. When the interaxle differential is locked out, the forward rear axle and the rearward rear axle are driven at the same rotational speed. The clutch may be manually actuated if desired. In either case, smoother and more efficient automatic operation results from use of a friction disk-type clutch or clutch pack.

7 Claims, 2 Drawing Sheets

TANDEM FORWARD REAR AXLE LOCKOUT

TECHNICAL FIELD

This invention relates to tandem axle assemblies and in particular to tandem rear axle assemblies for trucks and other load-carrying over-the-road vehicles.

BACKGROUND ART

Tandem rear axle assemblies having a forward rear axle and a rearward rear axle in proximity with each other are well known. Such tandem axle assemblies are widely used on trucks and other over-the-road motor vehicles, such as busses, which have a high vehicle weight and a high load carrying capacity. In such assemblies, both rear axles may be power driven.

An interaxle differential is commonly employed to divide power between drivetrains for the respective rear axles. An interaxle differential typically includes a single input shaft, which may be in direct drive relationship with a vehicle drive shaft, and gearing which includes a pair of output gears for delivering torque to the respective axle drivetrains. One output gear typically drives a shaft which drives the rearward rear axle for example, while the other output gear typically drives a pinion shaft which in turn drives the forward rear axle. Under normal operating conditions, i.e., when the wheels mounted on both rear axles have good traction, it is desirable for the interaxle differential to be able to function as a differential, so that the rotational speed of the output shafts may vary relative to one another. Under adverse conditions, however, such as a slippery road surface of ice, snow, or mud, when one of the rear axles may lose traction while the other rear axle has good traction, it is desirable to lock out the interaxle differential so that the pinion shaft and the input shaft rotate at a fixed speed ratio and commonly at the same speed. Where wheel slip occurs, torque from the vehicle drive shaft may thereby be transferred to a non-slipping axle for improved vehicle traction.

Various mechanisms, both manual and automatic, for locking out the interaxle differential are known. Earlier tandem rear axle assemblies relied on manual controls for this purpose. More recently, automatic differential lockout mechanisms have come into use. Such automatic mechanisms commonly include a toothed clutch or dog clutch having two relatively axially slidable members which can be brought into or out of engagement with each other, and a clutch actuator assembly including one or more sensors for sensing differential rotation between axles and for actuating the clutch to thereby lock out the interaxle differential. One such condition is a difference in rotational speeds of the two rear axles, which may occur, for example, when one axle is spinning (on snow or ice, for example) while the other axle has traction.

One problem with tandem rear axle assemblies which include a toothed clutch as described above is that they are not smooth in operation, whether the clutch is manually or automatically actuated. Additionally, known differential lockout mechanisms have not provided smooth automatic control to give precise traction control.

SUMMARY OF THE INVENTION

This invention provides a tandem axle assembly comprising first and second axles and an input shaft for receiving torque from a vehicle transmission. A first drivetrain for continuously transmitting torque from the input shaft to a first axle is provided, along with a second drivetrain for selectively transmitting torque from the input shaft to the second axle. An interaxle differential is provided to couple to the input shaft and to the first and second drivetrains, with the interaxle differential having a first output gear to drive the first drivetrain, and a second output gear rotatably mounted on the input shaft and in driving relationship with the second drivetrain. The tandem axle assembly of this invention further comprises a differential lockout mechanism for engaging this second output gear, thereby causing this second output gear to rotate at the same speed as the input shaft. The differential lockout mechanism comprises a clutch pack having a plurality of annular disks in interleaved first and second sets, wherein the disks of the first set are driven by the input shaft and rotate therewith, and the disks of the second set rotate with the second output gear. A clutch actuator assembly actuates the clutch pack to drive the first and second output gears together.

The preferred clutch actuator assembly is an automatic clutch actuator mechanism which comprises an axially reciprocable, fluid pressure actuated, piston for engaging the clutch and thereby locking out the interaxle differential on command. The actuator assembly may also include first and second speed sensors for sensing the rotational speeds of the first and second axles, respectively, and a control device for detecting the differential rotational speeds of the first and second axles and for generating an output signal when this differential exceeds a predetermined maximum. A solenoid-operated valve may be actuated by the output signal, which valve when actuated places the piston in communication with a source of fluid under pressure, thereby actuating the piston and the clutch pack and locking out the interaxle differential.

A main advantage of the differential lockout mechanism of the present invention is to provide a smoother transition of drive torque between tandem rear axles using a friction clutch pack as compared to toothed clutches used in known differential lockout mechanisms for tandem rear axle assemblies. The invention also enhances control of the differential lockout mechanism to allow improved automatic traction control.

BRIEF DESCRIPTION OF THE DRAWINGS

The aforementioned advantage, as well as other advantages of the present invention, will become apparent from the subsequent detailed description of the preferred embodiment, when taken in conjunction with the accompanying drawings, in which.

DETAILED DESCRIPTION

Figure 1:
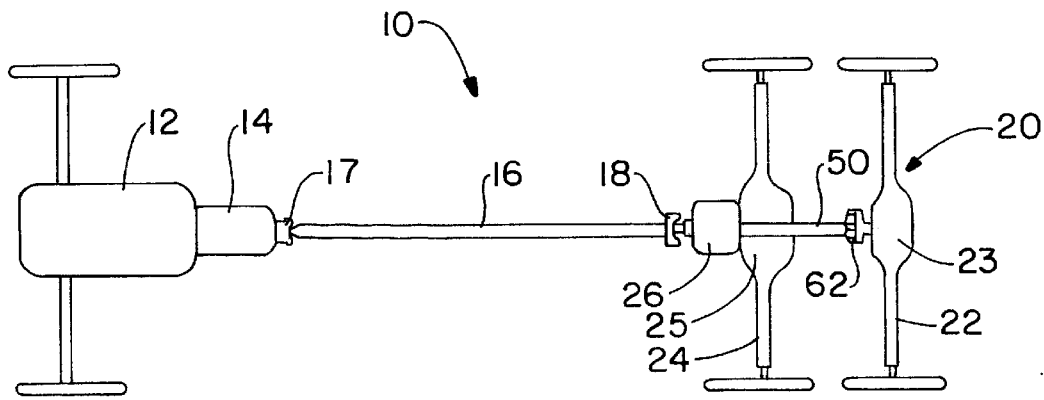
FIG. 1 is a schematic top-plan view of a vehicle having a tandem rear axle assembly which incorporates an interaxle differential lockout mechanism of this invention.

Referring now to the drawings, FIG. 1 illustrates an over-the-road vehicle and in particular a truck having a tandem rear axle assembly which may incorporate an interaxle differential lockout assembly according to this invention. Vehicle 10 has an engine 12 which is drivingly connected to a transmission 14. A main drive shaft 16 extends longitudinally from the transmission to a tandem rear axle assembly, and may be coupled at one end via a conventional coupling 17, such as a yoke or a universal joint, to the transmission, and at the other or rearward end by another conventional coupling 18 to a an input shaft of a tandem rear axle assembly 20.

Vehicle 10 may be any vehicle having a tandem axle assembly, such as a truck, bus or other over-the-road vehicle which has a tandem axle assembly comprising two axially spaced axles. Tandem axle assembly 20 is usually located near the rear of a vehicle and may therefore be referred to herein as a tandem rear axle assembly. Tandem rear axle assembly 20 comprises a first or rearward rear axle 22 which in turn comprises axially aligned right and left axle shafts which are driven through an axle differential 23. A second or forward rear axle 24 also comprises axially aligned right and left axle shafts which are driven through an axle differential 25. The axles 22 and 24 of the tandem rear axle assembly 20 herein are axially spaced apart but are in proximity with each other toward one end, of a vehicle.

All parts of both the vehicle 10 as a whole and the tandem rear axle assembly 20 described so far may be conventional. Thus the two axle differentials 23 and 25 (which are to be distinguished from an interaxle differential to be subsequently described) may be conventional.

Figure 2:
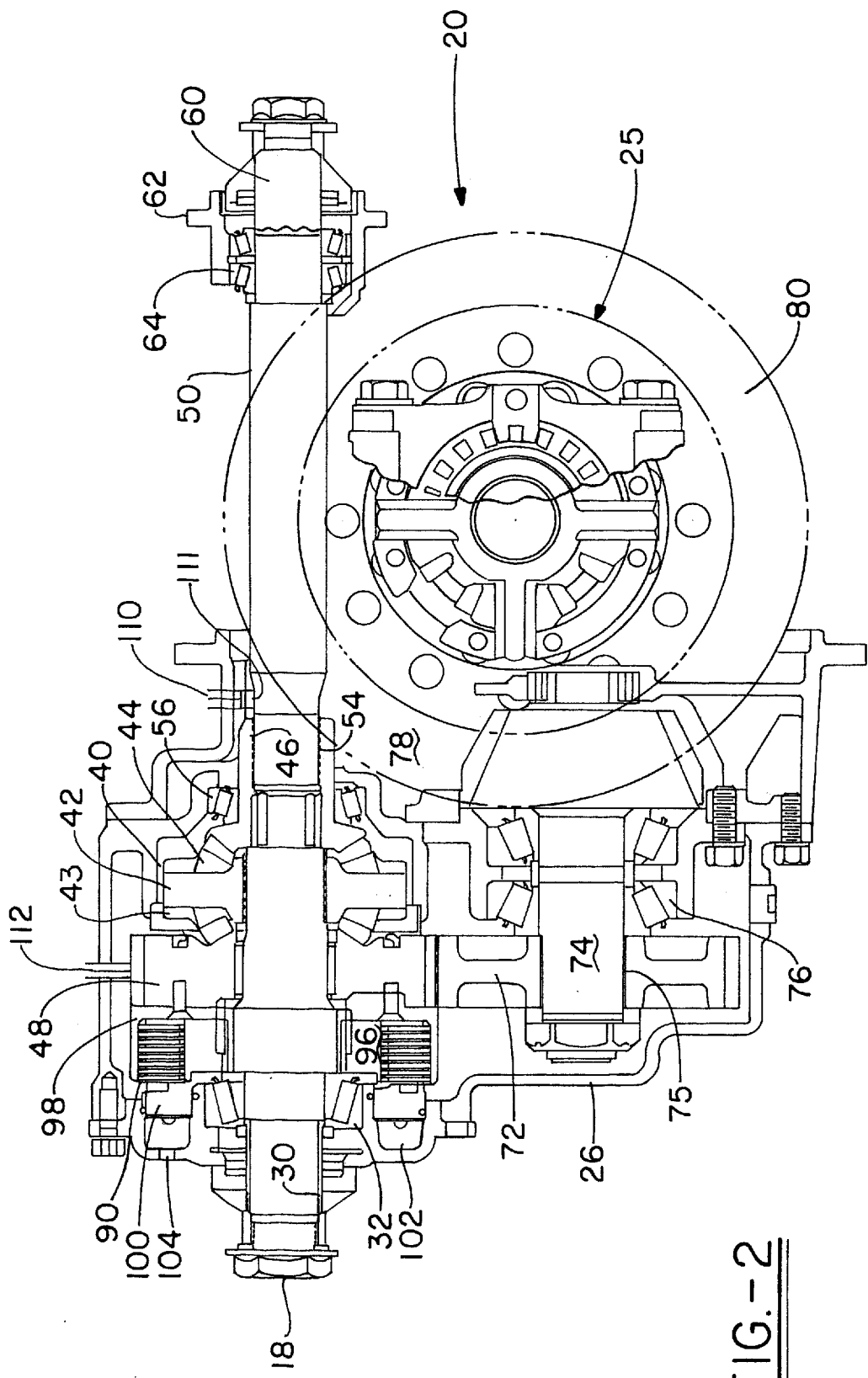
FIG. 2 is a longitudinal vertical sectional view of a preferred tandem rear axle assembly of this invention.

Turning to FIG. 2, the tandem axle assembly 20 of the preferred embodiment has a housing 26 at its forward end to rotatably support a longitudinally extending input shaft 30 by means of a bearing assembly 32. Input shaft 30 may be axially aligned with the vehicle drive shaft 16. The forward end of input shaft 30 is coupled to vehicle drive shaft 16 in direct drive relationship by means of coupling 18.

The rearward end of input shaft 30 is received in an interaxle differential 40. Shaft 30 transmits input torque from the vehicle drive shaft to the interaxle differential 40. Interaxle differential 40 may comprise a ring or pinion shafts 42 fixedly secured to shaft 30 so as to rotate therewith, a rotatably mounted carrier or spider 43, a plurality of differential pinion gears 44, a first output gear 46, and a second output gear 48. The first output gear 46, which may be a conventional side gear, is in full-time driving relationship with the input shaft 30 through the interaxle differential 40, and particularly through pinion gears 44. The second side gear 48 is concentric with and freely rotatable on input shaft 30.

A first drivetrain for driving rear axle 22 comprises first and second drive shafts (or output shafts) which are axially aligned and rotatable with the input shaft 30. The first drive shaft 50 at its forward end is driven by first side gear 46 through a splined connection 54. Both the first side gear 46 of the interaxle differential 40 and the forward end of shaft 50 are rotatably mounted within housing 26 by means of bearings 56.

The first output drive shaft 50 may be coupled at its rearward end to drive the power input shaft of the rearward rear axle 22 (FIG. 1) by means of a further output drive shaft 60 through a coupling 62 which may be a universal joint. A bearing set 64 which is supported within coupling 62 rotatably supports the rearward end of the first drive shaft 50. The second drive shaft serves as an input shaft for axle differential 23 (FIG. 1).

The second or forward rear axle 24 is driven by a second drivetrain shown in detail in FIG. 2. This drivetrain comprises a gear 72 which is driven by the output gear 48 through inter-meshing gear teeth on the respective outer circumferences of the two gears. Output gear 48 and driven gear 72 are both annular gears and preferably have the same outside diameter, so that both will rotate at the same rotational speed. Different gear ratios are also contemplated if desired. The output gear 48, which is of larger diameter than the interaxle differential 40, replaces a conventional side gear of an interaxle differential. Gear 72 is non-rotatably mounted on pinion shaft (or second output shaft) 74 and drives pinion shaft 74 through a splined connection 75. Pinion shaft 74 is rotatably mounted inside housing 26 by means of a bearing assembly 76. Pinion shaft 74, which has an axis of rotation which may be parallel to the common axis of rotation of previously described shafts 30, 50, and 60, in turn drives a beveled pinion gear 78, which is turn drives a ring gear 80. The ring gear in turn transmits torque to differential 25 (see also FIG. 1) of the forward rear axle 24. The forward rear axle 24 has right and left axially aligned shafts as is conventional, with only the right axle shaft being shown in FIG. 2. The structure of differential 25 may be conventional and so is not described in detail.

Figure 3:
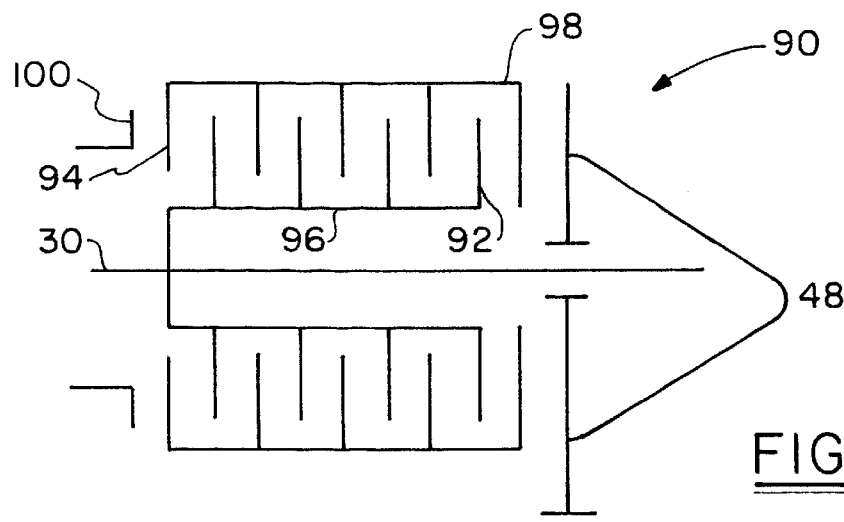
FIG. 3 is a diagrammatic illustration of a clutch pack used in the present invention.

The second drivetrain for driving the forward rear axle 24 is engaged or disengaged, as required, by a clutch assembly 90 which is mounted coaxially with drive shaft 30 by means of bearing assembly 32. Clutch assembly 90 in the preferred embodiment includes a friction clutch which is shown pictorially in FIG. 2 and schematically in FIG. 3. The clutch is a multiple-disk clutch or clutch pack comprising parallel, inter-leaved first and second sets of annular disks 92 and 94 respectively. The clutch disks 92 of the first set are keyed (e.g., by a splined connection) along their inner circumferential edges to an annular hub 96, which is keyed to the input shaft 30 so as to rotate therewith. The clutch disks 94 of the second set are keyed along their outer circumferential edges to the sleeve portion 97 of an annular drum 98, which is concentric with and freely rotatable on input shaft 30 and is coupled for rotation with the second output gear 48.

When clutch 90 is disengaged, shaft 50 in the first drivetrain and pinion shaft 74 in the second drivetrain may rotate at speeds which are different from each other and different from the rotational speed of input shaft 30. When clutch 90 is actuated, which locks out interaxle differential 40, the second drivetrain, including pinion shaft 74, is driven by input shaft 30 through the clutch assembly 90. In this state, input shaft 30, the in line shaft 50 of the first drivetrain, and the pinion shaft 74 all rotate at the same rotational speed. Alternatively, if the gear ratio of output gear 48 and driven gear 72 is other than 1:1, the rotational speed of pinion shaft 74 will not be equal to that of input shaft 30, but will be proportional to the rotational speed of input shaft 30 whenever the clutch assembly 90 is engaged.

Figure 4:
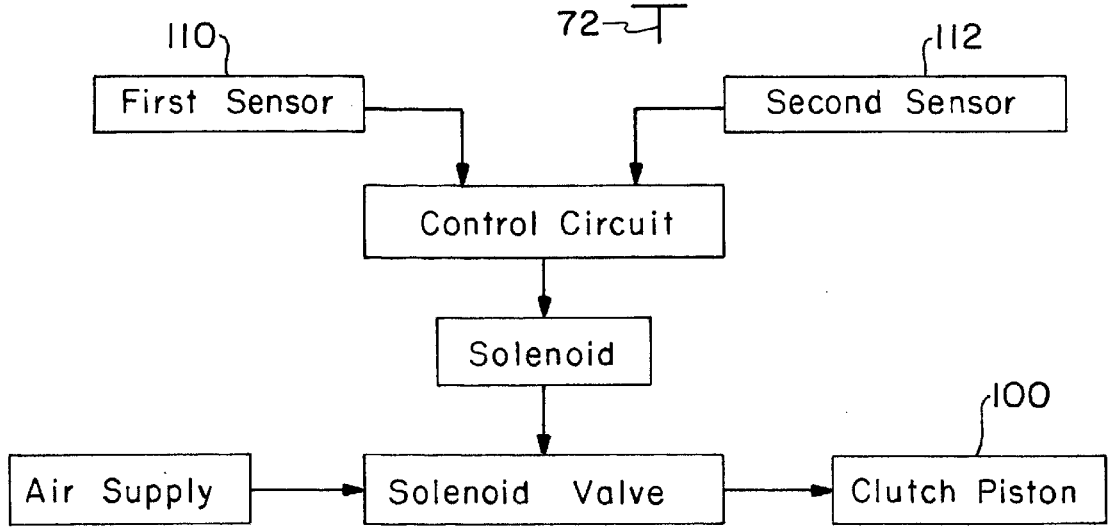
FIG. 4 is a diagrammatic illustration of a clutch actuation assembly of the present invention.

Clutch 90 is engaged by means of a clutch actuator assembly which is shown diagrammatically in FIG. 4. This clutch actuator assembly may include an annular compression member, e.g., a clutch piston 100, which is also shown in FIG. 2. Piston 100 is mounted concentrically with input shaft 30 and is axially moveable relative thereto. Piston 100 engages an end face of clutch 90. Movement of clutch piston 100 is controlled by fluid pressure, preferably compressed air introduced into an air chamber at 102 in housing 26 through a port 104 in the housing. The air brake system of the vehicle 10 may serve as a source of compressed air. As will hereinafter be described in more detail, the clutch actuator may be controlled to selectively vary actuation of clutch 90 to allow the forward rear axle 24 to be driven with a predetermined torque split between axles 22 and 24. For example, the fluid pressure introduced into chamber 102 may be controlled to selectively vary the torque transferred to the forward rear axle 24 by allowing some slippage between clutch disks 92 and 94.

A pair of sensors 110 and 112 (which are shown in FIGS. 2 and 4) may sense the rotational speeds of the rearward rear axle 22 and the forward rear axle 24 respectively. These sensors may be of known type, and may include a tone wheel 111 mounted on shaft 50 which will allow rotational speed to be monitored by means of sensor 110. The first sensor 110 may be positioned adjacent the first output shaft 50 of the first drivetrain which drives the rearward rear axle 22, or in another location to monitor the rotational speed of the rear axle 22. The speed of shaft 50 is proportional to the speed of the rearward rear axle 22. The second speed sensor 112 may be positioned by the output gear 48, which is in driving relationship with the second drivetrain, which drives the second or forward rear axle 24. The speed of output gear 48 is proportional to the speed of the pinion shaft 74 and the forward rear axle 24.

The rotational speeds of the two rear axles 22 and 24 are compared as will be described, and when the difference exceeds a predetermined limit, as for example when one of the rear axles is spinning while the other is on solid ground or pavement (which may happen on ice or snow), an output signal will be generated. Although speed sensors 110 and 112 are shown as part of the axle assembly, the rotational speeds of the axles 22 and 24 may be sensed by other sensors which may be provided for other functions. For example, an ABS braking system may be provided with the vehicle, and speed sensors associated with the braking system may be used to generate signals corresponding to the rotational speeds of the axles, which are supplied to control circuit 120. This will eliminate any duplication of such sensors if provided for other functions.

A preferred clutch actuator assembly is shown diagrammatically in FIG. 4. Referring to FIG. 4, first sensor 110 and second sensor 112 (which are also shown in FIG. 2) sense the rotational speeds of the rearward rear axle 22 and the forward rear axle 24, respectively, and generate signals proportional to the respective speeds. These signals are fed to a computer control circuit 120. When the difference between these speeds exceeds a predetermined value, an output signal is generated by the control circuit and is transmitted to solenoid 122. When solenoid 122 is actuated, solenoid valve 124 is opened, allowing compressed air to flow from an air supply 126 (which may be an air compressor which also furnishes compressed air to a vehicle braking system) to an air chamber 102 (FIG. 2), actuating piston 100 and causing the same to move to the right as seen in FIG. 2. This engages clutch pack 90 by compressing the clutch pack between the piston 100 and drum 98 coupled for rotation with output gear 48. This places the disks of the clutch 90 into frictional engagement, providing a direct drive path from input shaft 30 through clutch 90 to pinion shaft 74 and the remainder of the drivetrain for the forward rear axle 24, by-passing the interaxle differential 40. Consequently, both rear axles 22 and 24 are caused to rotate at the same speed. As mentioned previously, the control system 120 may be used to actuate clutch 90 to allow slippage between clutch plates 92 and 94 to vary the torque transferred to the forward rear axle 24 in the preferred embodiment. The solenoid valve 124 may be operated to produce a variable amount of bias against the disks of clutch 90 to thereby vary the amount of torque transferred between the rearward and forward rear axles 22 and 24.

Although a computer controlled clutch actuator is preferred, other clutch actuation clutch mechanisms may be used. Thus, the signals generated by speed sensors 110 and 112 may be fed to an electronic comparator which will generate a signal whose voltage is proportional to the difference in speed sensed by sensors 110 and 112. When this signal exceeds a predetermined voltage, the signal may be passed through to a solenoid 122, which will cause a solenoid to operate at valve 124 to open as previously described, allowing compressed air to flow to air chamber 102, actuating piston 100.

The piston actuator system may employ hydraulic fluid under pressure or may be operated electro-magnetically if desired as an alternative to compressed air. Other clutch actuation arrangements are also contemplated.

Clutch 90 may be actuated manually by the driver if desired. If manual actuation is provided, then such manual actuation may either replace or supplement (as a manual override) the automatic actuation system shown and described.

While the clutch 90 as shown is coaxial with the input shaft 30, it will be apparent that the clutch may be coaxial with the pinion shaft 74. This may be accomplished, for example, by making gear 72 freely rotatable on pinion shaft 74 and by providing gear 72 with either a hub or a sleeve to which one set of disks of the clutch therefore is secured. The other set of clutch disks may then be secured to a sleeve or hub of an annular drum or plate which is mounted (as, for example, by means of a splined connection) to rotate with pinion shaft 74.

Other modifications will be apparent to those skilled in the art.

The operation of the preferred tandem rear axle assembly herein will now be briefly described.

Under normal operating conditions, e.g., a dry road, wheels mounted on both the rearward rear axle 22 and the forward rear axle 24 rotate at essentially the same speed. Under such conditions, clutch 90 is disengaged, and torque is supplied to both rear axles through the interaxle differential 40 and through respective shafts driven by the interaxle differential, i.e., in line shaft 50 and pinion shaft 74. The interaxle differential 40 is free to differentiate, so that the respective shafts 50 and 74 can be driven at different speeds if required.

Under adverse conditions, such as in snow or ice, wheels mounted on either the rearward rear axle 22 or the forward rear axle 24 may lose traction and spin. If wheels mounted on the rearward rear axle 22 lose traction, the speed of in line shaft 50 will increase. There will be no corresponding increase in the speed of the pinion shaft 74 or the wheels mounted on the forward rear axle 24, whose speed is determined by the over-the-road speed of the vehicle 10. Similarly, if wheels mounted on the forward rear axle 24 lose traction, the pinion shaft 74 will speed up while the speed of in line shaft 50 and wheels mounted on the rearward rear axle will stay essentially the same. If the difference between the speeds sensed by sensors 110 and 112 exceeds a predetermined limit, the clutch 90 will be actuated, and torque from input shaft 30 will be transmitted through the clutch assembly 90 to pinion shaft 74 and the remainder of the second drivetrain, bypassing or locking out the interaxle differential 40. Pinion shaft 74 now rotates at the same rotational speed as input shaft 30. Both output gears 46 and 48 of the interaxle differential 40, as well as shaft 50 in the first drivetrain, will also have the same rotational speed. As a result, wheels mounted on both the rearward rear axle 22 and those mounted on the forward rear axle 24 will be driven at the same speed. Torque is thus applied to the rear axle having good traction, and spinning of the rear axle which has lost traction is prevented.

An important feature of this invention is that it utilizes an annular disk-type friction clutch, or clutch pack, instead of a dog clutch comprising a pair of relatively slidable members each having teeth (or cogs or dogs) on each of the members. Much smoother transition from the normal operating state (clutch disengaged) to the state in which the interaxle differential is locked out (clutch engaged), is achieved by using a clutch pack instead of a conventional dog clutch. Such increased smoothness is achieved whether the shift is controlled automatically or manually by the driver. In particular, a tandem axle assembly which employs speed sensors for determining speeds of both axles, and a clutch pack which is engaged when a difference between axle speeds is excess of predetermined levels or an excessive torque on the full time axle, results in smooth and highly reliable automatic operation.

While the forgoing description has set for the preferred embodiment of the invention, it is understood that numerous modifications, substitutions, and changes can be undertaken without departing from the true scope and spirit of the present invention as defined by the appended claims.

What is claimed is:

1. A tandem axle assembly, comprising:
    (a) a rearward rear axle and a forward rear axle in proximity with each other and having parallel axes;
    (b) an input shaft;
    (c) a first drivetrain for transmitting torque to said rearward rear axle;
    (d) a second drivetrain for transmitting torque to said forward rear axle, said second drivetrain including a pinion shaft, a pinion and a ring gear and said pinion shaft and said input shaft are rotatable about parallel axes;
    (e) an interaxle differential connected to said input shaft and having a first output gear connected to said first drivetrain and a second output gear rotatably mounted on said input shaft and connected to said second drivetrain;
    (f) a differential lockout mechanism for engaging said second output gear on command so that it rotates at the same speed as said input shaft, said differential lockout mechanism comprising:
        (1) a clutch pack for selectively engaging and disengaging said second drivetrain, said clutch pack being concentric with said input shaft and comprising a plurality of parallel annular disks arranged in interleaved first and second sets, a hub which is driven by said input shaft and a sleeve which is rotatable mounted on said input shaft and in driving relationship with said second output gear, said hub and said sleeve being concentric with said input shaft, said first set of disks being keyed to and rotatable with said hub and said second set of disks being keyed to and rotatable with said sleeve; and
        (2) a clutch actuator assembly for actuating said clutch pack, said clutch actuator assembly comprising:
            (i) first and second speed sensors for sensing the rotational speeds of said rearward rear axle and said forward rear axle respectively;
            (ii) a control device for generating an output signal when the difference in rotational speeds of said rearward rear axle and said forward rear axle as sensed by said speed sensors, exceeds a predetermined limit; and
            (iii) an axially moveable annular compression member disposed adjacent to an end face of said clutch pack, said compression member being actuated in response to said output signal to compress said clutch pack and thereby place said second drivetrain and said forward rear axle in driving relationship with said input shaft through said clutch.

2. A tandem axle assembly according to claim 1 wherein said clutch actuator assembly comprises:
    (1) first and second speed sensors for sensing the rotational speeds of said first axle and said second axle respectively;
    (2) a control device for generating an output signal when the difference in rotational speeds of said first and second axles, as sensed by said speed sensors, exceeds a predetermined limit;
    (3) an axially moveable annular compression member disposed adjacent to an end face of said clutch pack, said compression member being actuated in response to said output signal to compress said clutch pack and thereby place said second drivetrain and said second axle in driving relationship with said input shaft through said clutch.

3. The tandem axle assembly in accordance with claim 1, wherein said first drivetrain includes a shaft which is coaxial with said input shaft.

4. The tandem axle assembly in accordance with claim 1, wherein said sleeve is in driving engagement with said second output gear and wherein said second output gear is in driving engagement with a gear non-rotatably mounted on said pinion shaft.

5. The tandem axle assembly in accordance with claim 1, wherein said clutch pack is actuated by fluid pressure, said compression member is a piston disposed in a chamber for receiving fluid under pressure and said clutch actuator assembly includes a solenoid-operated valve for selectively admitting fluid under pressure to said chamber.

6. The tandem axle assembly in accordance with claim 5, wherein said fluid pressure is air pressure.

7. The tandem axle assembly in accordance with claim 1, wherein said control device is computer controlled.

* * * * *